United States Patent
Chinitz et al.

(10) Patent No.: US 6,802,208 B2
(45) Date of Patent: Oct. 12, 2004

(54) VEHICLE WHEEL BEARING AND METHOD FOR CONTROLLING A VEHICLE

(75) Inventors: Steven M. Chinitz, Huron, OH (US); Melissa A. Conezio, Perrysburg, OH (US); Robert M. Brown, Elyria, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/091,396

(22) Filed: Mar. 4, 2002

(65) Prior Publication Data

US 2003/0164050 A1 Sep. 4, 2003

(51) Int. Cl.[7] .......................... G01M 19/00; G01L 5/12
(52) U.S. Cl. ................... 73/118.1; 73/862.49
(58) Field of Search .................. 384/448, 488, 384/477, 484; 324/173, 174, 207.22, 160; 301/111; 73/862.49, 118.1, 862.55, 493, 593, 862.541; 29/894.361; 310/90

(56) References Cited

U.S. PATENT DOCUMENTS

| | | | | |
|---|---|---|---|---|
| 5,127,747 A | * | 7/1992 | Hilby et al. | 384/448 |
| 5,488,871 A | * | 2/1996 | Harbottle et al. | 73/862.55 |
| 5,503,030 A | * | 4/1996 | Bankestron | 73/862.627 |
| 5,952,587 A | * | 9/1999 | Rhodes et al. | 73/862.541 |
| 6,002,248 A | * | 12/1999 | Binder | 324/160 |
| 6,161,962 A | * | 12/2000 | French et al. | 384/459 |
| 6,293,140 B1 | | 9/2001 | Lohberg | 73/146 |
| 6,408,669 B1 | | 6/2002 | Meeker et al. | |
| 6,457,869 B1 | * | 10/2002 | Smith et al. | 384/448 |
| 6,471,407 B1 | * | 10/2002 | Katano | 384/448 |
| 6,485,185 B1 | * | 11/2002 | Conway, Jr. et al. | 384/484 |
| 6,485,187 B1 | | 11/2002 | Meeker et al. | |
| 6,490,935 B1 | * | 12/2002 | Joki et al. | 73/862.04 |
| 6,574,865 B2 | | 6/2003 | Meeker et al. | |
| 6,575,535 B2 | | 6/2003 | Meeker et al. | |
| 6,622,377 B1 | | 9/2003 | Johnson et al. | |

FOREIGN PATENT DOCUMENTS

EP 0432122 6/1991

* cited by examiner

Primary Examiner—Edward Lefkowitz
Assistant Examiner—Octavia Davis
(74) Attorney, Agent, or Firm—Michael D. Smith

(57) ABSTRACT

A vehicle wheel bearing includes a non-rotatable section, a rotatable section, and at least one sensor. The rotatable section is rotatably attached to the non-rotatable section. The at-least-one sensor has an output used for determining at least one component of a force applied to the rotatable section. A method for controlling a vehicle includes attaching at least one sensor to at least one of the non-rotatable and rotatable sections of the vehicle wheel bearing. At least one component of the force applied to the rotatable section is determined from the output of the at-least-one sensor, and the vehicle is controlled based at least in part on the determined at-least-one component.

20 Claims, 4 Drawing Sheets

VEHICLE WHEEL BEARING AND METHOD FOR CONTROLLING A VEHICLE

TECHNICAL FIELD

The present invention relates generally to vehicles, and more particularly to a vehicle wheel bearing and to a method for controlling a vehicle.

BACKGROUND OF THE INVENTION

Vehicles include automotive vehicles having wheel bearings wherein each wheel bearing includes a non-rotatable section and a rotatable section rotatably attached to the non-rotatable section. Typically a wheel is attached to the rotatable section, and the non-rotatable section typically is attached to a suspension system component. In some conventional vehicles, an anti-lock-braking-system (ABS) wheel speed sensor has a sensing component attached to the suspension system and has a sensed component in the form of a target ring attached to the rotatable section of the wheel bearing.

Vehicle control systems include, without limitation, vehicle stability enhancement systems. Conventional vehicle stability enhancement systems gather vehicle inputs (such as wheel speed and vehicle yaw rate) and adjust vehicle performance characteristics (such as suspension stiffness). In one known system, a magnetic sensor has a sensing component attached to an end of an arm whose other end is attached to a suspension system component and has a sensed component in the from of magnetic material molded into the sidewall of a tire. The sensor output is used for determining a longitudinal component of the force applied to the tire, wherein the determined longitudinal force component is an input to a vehicle anti-lock brake system. In another known system, a stress-based load sensor is attached to the wheel bearing outside the sealed bearing cavity and has an output used for a vehicle control system.

Conventional stress-based load cells have been used in vehicle development for determining the three-axis components of a force applied to the wheel bearing through tire loads. The determined force was used to improve vehicle design. In one conventional test application, the load cell had one load-cell component attached to the non-rotatable section of the wheel bearing and had another load-cell component attached to a suspension-system component. In another conventional test application, the load cell components were installed in an external load cell module which was attached to the rotatable section of the wheel bearing outside the sealed bearing cavity.

What is needed is an improved vehicle wheel bearing and an improved method for controlling a vehicle.

SUMMARY OF THE INVENTION

An expression of an embodiment of the invention is for a vehicle wheel bearing including a vehicle-wheel-bearing non-rotatable section, a vehicle-wheel-bearing rotatable section, and at least one sensor. The vehicle-wheel-bearing rotatable section is rotatably attached to the non-rotatable section. The at-least-one sensor is attached to at least one of the non-rotatable and rotatable sections and has an output used for determining at least one component of a force applied to the rotatable section. The at-least-one sensor measures temperature.

An expression of another embodiment of the invention is for a vehicle wheel bearing including a vehicle-wheel-bearing non-rotatable section, a vehicle-wheel-bearing rotatable section, and at least one sensor. The vehicle-wheel-bearing rotatable section is rotatably attached to the non-rotatable section. The at-least-one sensor is attached to at least one of the non-rotatable and rotatable sections and has an output used for determining at least one component of a force applied to the rotatable section. The at-least-one sensor measures the distance between the non-rotatable and rotatable sections.

An expression of an additional embodiment of the invention is for a vehicle wheel bearing including a vehicle-wheel-bearing non-rotatable section, a vehicle-wheel-bearing rotatable section, and at least one sensor. The vehicle-wheel-bearing rotatable section is rotatably attached to the non-rotatable section. The at-least-one sensor is attached to at least one of the non-rotatable and rotatable sections and has an output used for determining at least one component of a force applied to the rotatable section. The rotatable section includes a first race, the non-rotatable section includes a second race, and the first and second races define a raceway. The vehicle wheel bearing also includes rolling elements positioned in the raceway. The at-least-one sensor senses the passage of the rolling elements around the raceway past the at-least-one sensor.

An expression of a further embodiment of the invention is for a vehicle wheel bearing including a vehicle-wheel-bearing non-rotatable section, a vehicle-wheel-bearing rotatable section, and at least one sensor. The vehicle-wheel-bearing rotatable section is rotatably attached to the non-rotatable section. At least one of the non-rotatable and rotatable sections includes at least a portion of an inboard bearing seal, at least one of the non-rotatable and rotatable sections includes at least a portion of an outboard bearing seal, and the outboard bearing seal is spaced apart from the inboard bearing seal. The at-least-one sensor is positioned between the inboard and outboard bearing seals and has an output used for determining at least one component of a force applied to the rotatable section.

A method of the invention is for controlling a vehicle having a wheel bearing including a non-rotatable section, including a rotatable section rotatably attached to the non-rotatable section, and including rolling elements positioned between the non-rotatable and rotatable sections. The method includes steps a) through c). Step a) includes attaching at least one sensor to at least one of the non-rotatable and rotatable sections, wherein the at-least-one sensor has an output and measures at least one of the passage of the rolling elements, the distance between the non-rotatable and rotatable sections, and a temperature. Step b) includes determining at least one component of a force applied to the rotatable section from the output of the attached at-least-one sensor of step a). Step c) includes controlling the vehicle based at least in part on the determined at-least-one component of step b).

Several benefits and advantages are derived from one or more of the expressions of the embodiments and/or from the method of the invention. Attaching a temperature, a distance, and/or a rolling-element-passage-sensing sensor (whose output is used for determining at least one component of a force applied to the rotatable section of the wheel bearing) to at least one of the non-rotatable and rotatable sections of the wheel bearing yields an accurate force determination at the wheel bearing, as can be appreciated by those skilled in the art. Positioning any type of sensor (whose output is used for determining at least one component of a force applied to the rotatable section of the wheel bearing) between the inboard and outboard seals protects the sensor from road and environmental hazards. Such sensors are useful, for example, in controlling a vehicle.

DESCRIPTION OF THE PREFERRED EMBODIMENTS

Figure 1:
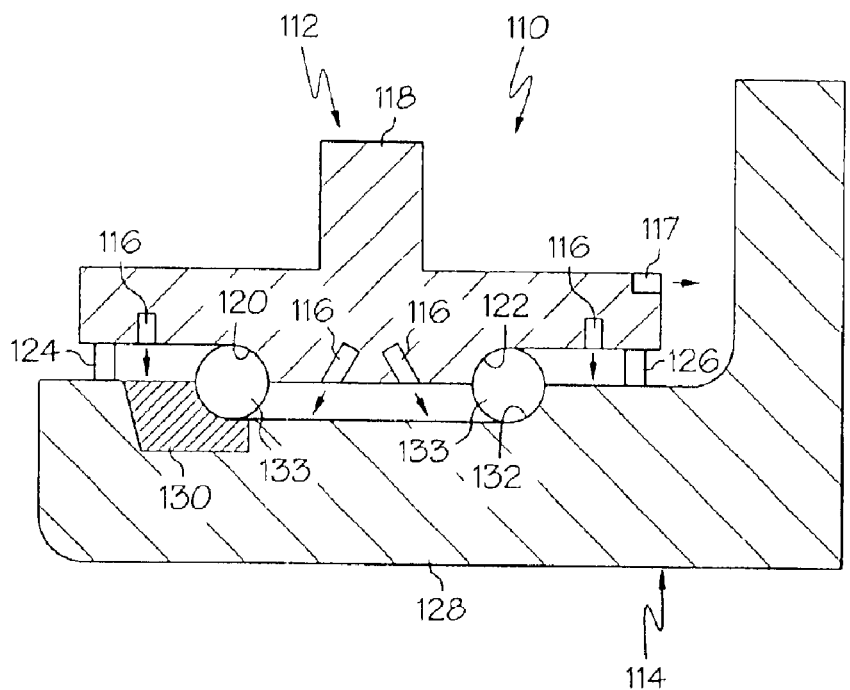
FIG. 1 is an above-centerline, schematic, side cross-sectional view of a first embodiment of a vehicle wheel bearing of the invention including rolling elements, including a raceway with outer and inner races, including inboard and outboard seals, and including distance sensors attached to the hub of the non-rotatable section of the wheel bearing.

Referring now to the drawings, FIG. 1 illustrates a first embodiment of the present invention. A first expression of the first embodiment is for a vehicle wheel bearing 110 including a vehicle-wheel-bearing non-rotatable section 112, a vehicle-wheel-bearing rotatable section 114, and at least one sensor 116 and 117. The vehicle-wheel-bearing rotatable section 114 is rotatably attached to the non-rotatable section 112. The at-least-one sensor 116 and 117 is attached to at least one of the non-rotatable and rotatable sections 112 and 114 and has an output used for determining a component of a force applied to the rotatable section 114.

In one implementation, the at-least-one sensor 116 and 117 measures temperature, the distance between the non-rotatable and rotatable sections 112 and 114, or the passage of rolling elements and is disposed between, or is not disposed between, inboard and outboard bearing seals 124 and 126. In another implementation (which would eliminate the upper-right-most sensor 117 in FIG. 1), the at-least-one sensor 116 is not limited to measuring temperature, distance, or the passage of rolling elements (and could include, for example, a stress-based load sensor) but is disposed between the inboard and outboard bearing seals 124 and 126. In one construction, at least one of the non-rotational and rotational sections 112 and 114 includes a portion of the inboard bearing seal 124, and at least one of the non-rotational and rotational sections 112 and 114 includes a portion of the outboard bearing seal 126, wherein the outboard bearing seal 126 is spaced apart from the inboard bearing seal 124.

In one application, the force is a tire-load-imposed force. Vehicles having wheel bearings include, without limitation, automotive vehicles such as cars and trucks. It is noted that, in one vehicle assembly method, the vehicle wheel bearing 110 is an assembled unit which is bolted to a vehicle suspension system component and to which a vehicle wheel is mounted. The vehicle suspension system components and the vehicle wheel (and the vehicle tire) are not components of a vehicle wheel bearing as is known to the artisan. For purposes of describing the embodiments and method of the invention, a sensor (having just a sensing component or having both a sensing component and a sensed component) attached to a vehicle suspension system component and/or to a vehicle wheel (or vehicle tire) is not considered attached to a vehicle wheel bearing component such as a non-rotatable section or a rotatable section of a vehicle wheel bearing. In other words, a sensor connected to a vehicle wheel bearing component through an intervening vehicle suspension system component and/or a vehicle wheel is not considered to be attached to the vehicle wheel bearing component.

In one example, the non-rotatable section 112 includes a hub 118 having a monolithic inboard outer race 120 and a monolithic outboard outer race 122 and includes the non-rotatable portions of inboard and outboard seals 124 and 126. In this example, the rotatable section 114 includes a spindle 128 having a separate inboard inner race 130 and a monolithic outboard inner race 132 and includes the rotatable portions of the inboard and outboard seals 124 and 126. The wheel bearing example also includes rolling elements 133 which are disposed in the inboard raceway formed by the inboard races 120 and 130 and which are disposed in the outboard raceway formed by the outboard races 122 and 132. Rolling elements include, without limitation, balls and rolling elements having the shape of a cylinder, a barrel, or a truncated cone. It is noted that having the hub rotatable and the spindle non-rotatable is equivalent to having the hub non-rotatable and the spindle rotatable. Hubs, spindles, raceways, rolling elements, and seals are well known components of examples of vehicle wheel bearings.

In one application, the determined at-least-one component of the force is an input to a vehicle control system. Vehicle control systems include, without limitation, vehicle braking systems, vehicle anti-lock braking systems, vehicle stability enhancement systems, vehicle anti-rollover systems, vehicle traction systems, and vehicle acceleration systems, as is known to the artisan. In one implementation, the output of the at-least-one sensor 116 and 117 is used for determining three mutually orthogonal components of the force. In another implementation, the output of the at-least-one sensor 116 and 117 is used for determining two mutually orthogonal components of the force. In a further implementation, the output of the at-least-one sensor 116 and 117 is used for determining one component of the force along one direction.

In one sensor embodiment, the at-least-one sensor 116 and 117 measures the distance between the non-rotatable and rotatable sections 112 and 114 (along the direction of the unnumbered arrows in FIG. 1). Examples of such sensors 116 and 117 include, without limitation, optical distance-measuring sensors, capacitance sensors, ultrasonic distance-measuring sensors, and Hall-effect sensors, as is known to the artisan. In one implementation, the distance measurement of the at-least-one sensor 116 and 117 is used, along with an experimentally or mathematically determined relationship between a tire-load-imposed force applied to the rotatable section 114 and the distance measurement to determine the force component(s), as is within the routine capabilities of those skilled in the art. In one application, the at-least-one sensor 116 and 117 is attached (and in one construction permanently attached meaning detachment would cause component damage) to the hub 118. In one variation, several sensors 116 and 117 are used to measure the distance between the hub 118 and the spindle 128 along different orientations sufficient in number and direction from which to compute distances along three (or two) mutually orthogonal axes of a coordinate system. The distances will change as the tire-load-imposed force applied to the spindle changes. In one example, not shown, the one or several sensors 116 are all disposed between (and optionally on) the inboard and outboard bearing seals 124 and 126. In another example, at least one of the at-least-one sensor 117 is disposed outside (and optionally on) the inboard and outboard bearing seals 124 and 126 as shown by the upper-right-most sensor 117 in FIG. 1.

Figure 2:
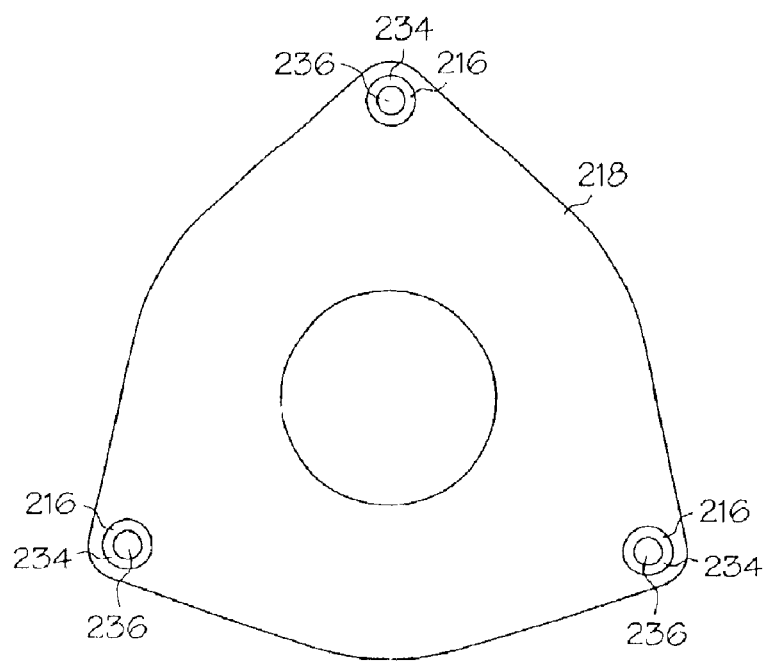
FIG. 2 is a front elevational view of a second embodiment of a portion of the vehicle wheel bearing of FIG. 1 including a hub of a vehicle wheel bearing, wherein the bearing also includes a stress-based load sensor attached to the hub.

A second embodiment of portions of the vehicle wheel bearing of FIG. 1 including the vehicle-wheel-bearing hub 218 and the at-least-one sensor 216 is shown in FIG. 2. The at-least-one sensor 216 includes a stress-based load sensor 234. Examples of such stress-based load sensors 234 include, without limitation, strain gauges and piezoelectric material, as is known to the artisan. It is noted that the maximum threshold on a strain gauge needs to be much higher than the expected maximum forces to protect the gauge over the life of the wheel bearing. In one implementation, the output of the stress-based load sensor 234 is used, along with an experimentally or mathematically determined relationship between a tire-load-imposed force applied to the rotatable section (e.g., the spindle) and the output of the stress-based load sensor 234 to determine the force component(s), as is within the routine capabilities of those skilled in the art. In one application, the stress-based load sensor 234 is attached to the hub 218. In one design, the hub 218 has a bolt hole 236, and the stress-based load sensor 234 surrounds the bolt hole 236. In another design, not shown, the stress-based load sensor does not surround the bolt hole and is disposed away from the bolt hole. In one modification, strain gauges are located on areas of the hub where the maximum amount of strain is seen, wherein, in one procedure, finite element analysis is used to determine maximum strain areas of the hub. In one variation, each stress-based load sensor 234 measures along three (or two) mutually orthogonal axes of a coordinate system and surrounds a corresponding one of the bolt holes. Examples of this variation include, without limitation, a strain gauge which includes three (or two) mutually orthogonal strain measuring components and a sensor having three (or two) mutually-orthogonally-aligned piezoelectric components. Other variations are left to the artisan.

Figure 3:
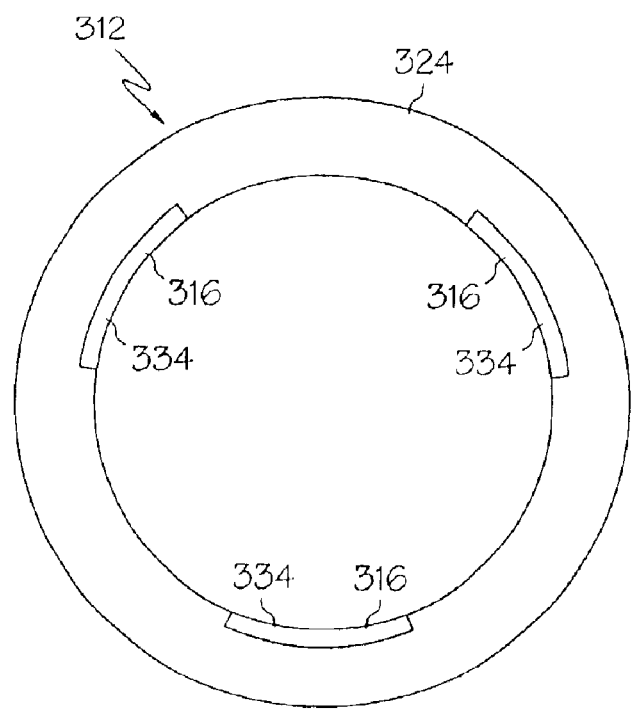
FIG. 3 is a front elevational view of a third embodiment of a portion of the vehicle wheel bearing of FIG. 1 including a seal of a vehicle wheel bearing, wherein the bearing also includes a stress-based load sensor attached to the seal.

A third embodiment of portions of the vehicle wheel bearing of FIG. 1 including one of the seals 324 and the at-least-one sensor 316 is shown in FIG. 3. The at-least-one sensor 316 includes a stress-based load sensor 334. The non-rotatable section 312 includes a non-rotatable portion of the seal 324, and the stress-based load sensor 334 is attached to the non-rotatable portion of the seal 324.

Figure 4:
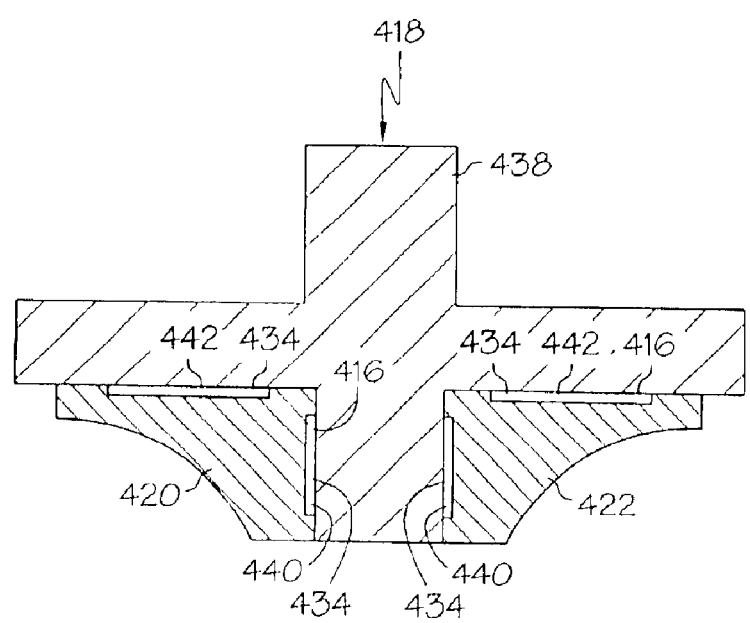
FIG. 4 is an above-centerline, schematic, side cross-sectional view of a fourth embodiment of a portion of the vehicle wheel bearing of FIG. 1 including a hub of a vehicle wheel bearing, wherein the hub includes a base portion and a separate race portion, and wherein the bearing also includes a stress-based load sensor attached to the hub between the base portion and the race portion.

A fourth embodiment of portions of the vehicle wheel bearing of FIG. 1 including the hub 418 is shown in FIG. 4. Here, the hub 418 includes a base portion 438 and separate inboard and outboard outer races 420 and 422 attached to the base portion 438. A stress-based load sensor 434, such as (but not limited to) one comprising piezoelectric material, is attached to the hub 418 by being disposed between the base portion 438 and the inboard and outboard outer races 420 and 422. In one application, radially-extending stress-based load sensors 440 each have an annular disc shape and longitudinally-extending stress-based load sensors 442 each have an annular cylindrical shape. It is noted that, in this embodiment, the stress-based load sensor 434 is disposed between (and optionally on) the inboard and outboard bearing seals.

Figure 5:
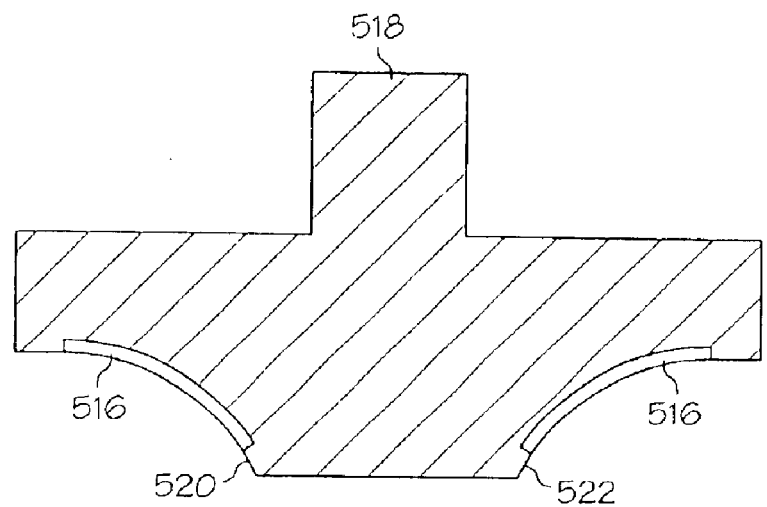
FIG. 5 is an above-centerline, schematic, side cross-sectional view of a fifth embodiment of a portion of the vehicle wheel bearing of FIG. 1 including a hub of a vehicle wheel bearing, wherein the bearing also includes a temperature sensor attached to the hub.

A fifth embodiment of portions of the vehicle wheel bearing of FIG. 1 including the hub 518 and the at-least-one sensor 516 is shown in FIG. 5. The at-least-one sensor 516 measures temperature. In one application, the at-least-one sensor 516 is attached to the hub 518. In one design, the at-least-one sensor 516 is attached (and in one construction permanently attached meaning detachment would cause component damage) to the hub 518 proximate at least one of the inboard and outboard outer races 520 and 522. In one implementation, the spatial temperature distribution of a portion of the hub is used, along with an experimentally or mathematically determined relationship between a tire-load-imposed force and the spatial temperature distribution, to determine the force component(s), as is within the routine capabilities of those skilled in the art. In one variation, several temperature sensors are used. It is noted that, in this embodiment, the temperature sensor 516 is disposed between (and optionally on) the inboard and outboard bearing seals, but that in other embodiments, not shown, the temperature sensor is not disposed between (but may be disposed optionally on) the inboard and outboard bearing seals.

Figure 6:
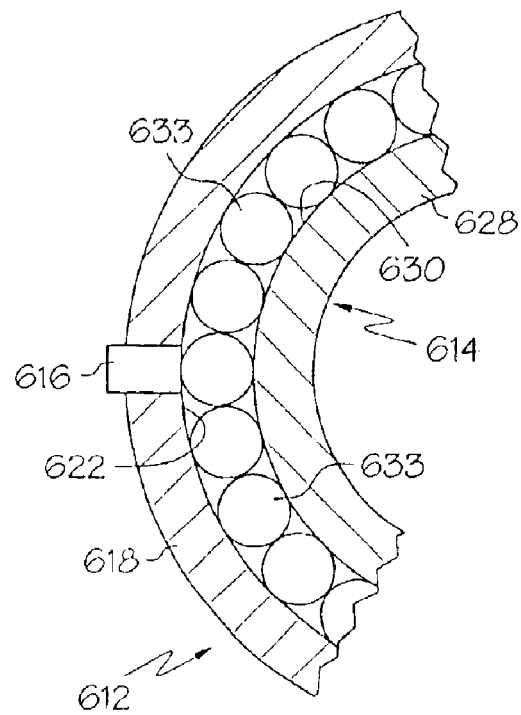
FIG. 6 is a cross-sectional view of a sixth embodiment of a portion of the vehicle wheel bearing of FIG. 1 including a portion of a raceway and rolling elements of a vehicle wheel bearing, wherein the bearing also includes a sensor which senses the passage of the rolling elements around the raceway past the sensor.

A sixth embodiment of portions of the vehicle wheel bearing of FIG. 1 including the inboard inner race 630 of the spindle 628 (hereinafter also called a first race) and the inboard outer race 622 of the hub 618 (hereinafter also called a second race) is shown in FIG. 6. It is understood that the first and second races are not limited to inboard races and can be outboard races. Here, the rotatable section 614 includes the first race 630, the non-rotatable section 612 includes the second race 622, and the first and second races 630 and 622 define a raceway. The vehicle wheel bearing also includes rolling elements 633 disposed in the raceway. The at-least-one sensor 616 senses the passage of the rolling elements 633 around the raceway past the at-least-one sensor 616. Such sensors 616 include, without limitation, thickness sensors such as acoustic transducers which reflect off the inner surface of the first race 630 when a rolling element comes into alignment with the sensor and which reflect off the inner surface of the second race 622 when a between-rolling-element air gap comes into alignment with the sensor. Such sensors 616 also include, without limitation, piezoelectric material which senses vibrations each time a rolling element comes into alignment with the sensor. Such sensors 616 additionally include, without limitation, magnetic sensors having a sensing component attached to the second race 622 and having a sensed component such as magnetic material carried by the rolling element separators (not shown), such separators without magnetic material being well known in the art. In one construction, the at-least-one sensor 616 (or the sensing component if a magnetic sensor) is attached (and in one construction permanently attached meaning detachment would cause component damage) to the second race 622. In one variation, the at-least-one sensor 616 senses from the outer surface of the second race 622. In another variation, not shown, the at-least-one sensor is inserted into a radial through hole of the second race. In this variation, the at-least-one sensor moreover includes, without limitation, an optical sensor. In another construction, not shown, the at-least-one sensor 616 is aimed into the plane of the paper of FIG. 6. Other locations for the at-least-one sensor 616 are left to the artisan.

Such sensors 616 are used to measure the motion (for example, and without limitation, the speed) of the rolling elements 633. In one implementation, the speed of the rolling elements, together with wheel speed (determined, for example, by a conventional anti-lock braking system wheel speed sensor) are used to determine the orientation of the line of contact of the rolling elements 633 with the first and second races 630 and 622, as is within the routine capabilities of those skilled in the art. It also is within the routine capabilities of those skilled in the art to determine the force applied to the rotatable section 614 from the orientation of the line of contact of the rolling elements 633 with the first and second races 630 and 622.

It is noted that the previously-described sensors 116 and 117, 216, 316, 416, 516, and 616 can be used in any number and in any combination according to the needs of a particular vehicle wheel bearing application.

Figure 7:
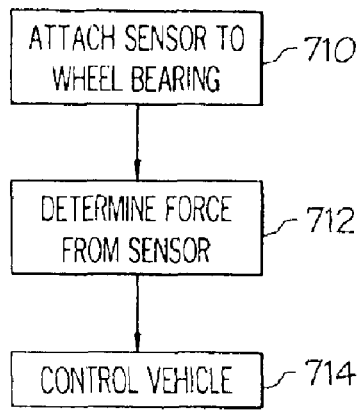
FIG. 7 is a flow chart of a method of the invention for controlling a vehicle.

A method of the invention is for controlling a vehicle having a wheel bearing 110 including a non-rotatable section 112 including a rotatable section 114 rotatably attached to the non-rotatable section 112, and including rolling elements 133 disposed between the non-rotatable and rotatable sections 112 and 114. The method includes steps a) through c). Step a) is labeled as "Attach Sensor To Wheel Bearing" in block 710 of FIG. 7. Step a) includes attaching at least one sensor 116 and 117 to at least one of the non-rotatable and rotatable sections 112 and 114, wherein the at-least-one sensor 116 measures at least one of the passage of the rolling elements 133, the distance between the non-rotatable and rotatable sections 112 and 114, and a temperature, and wherein the at-least-one sensor 116 and 117 has an output. Step b) is labeled as "Determine Force From Sensor" in block 712 of FIG. 7. Step b) includes determining at least one component of a force applied to the rotatable section 114 from the output of the attached at-least-one sensor 116 and 117 of step a). Step c) is labeled as "Control Vehicle" in block 714 of FIG. 7. Step c) includes controlling the vehicle based at least in part on the determined at-least-one component of step b). Control algorithms for controlling a vehicle based on force determinations are within the routine capabilities of those skilled in the art.

In some applications, the vehicle is controlled based also on other inputs such as vehicle yaw rate and wheel speeds. In one example, step b) determines three (or two) mutually orthogonal components of the force. In some variations using this example, step c) includes controlling the vehicle based only on the determined force of step b) for each wheel bearing.

Figure 8:
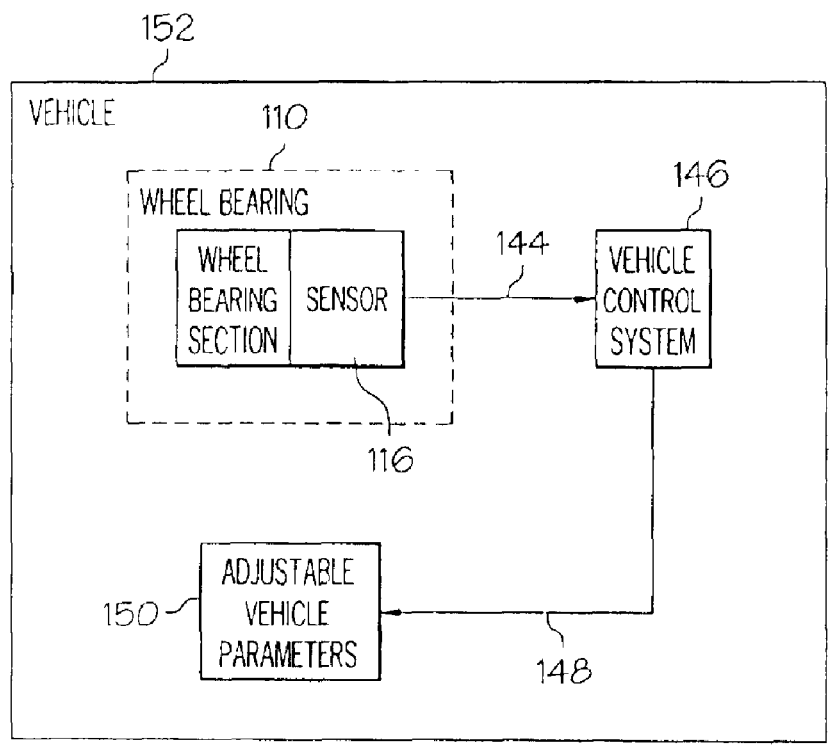
FIG. 8 is a schematic diagram of a vehicle including a vehicle control system.

FIG. 8 illustrates one implementation of the first method. The output 144 of the at-least-one sensor 116 and 117 (which is attached to at least one of the non-rotatable and rotatable sections of the wheel bearing 110) is used as an input to a vehicle control system 146. The output 148 of the vehicle control system 146 controls the adjustable vehicle parameters 150 (such as suspension stiffness) of the vehicle 152.

Several benefits and advantages are derived from one or more of the expressions of the embodiments and/or from the method of the invention. Attaching a temperature, a distance, and/or a rolling-element-passage-sensing sensor (whose output is used for determining at least one component of a force applied to the rotatable section of the wheel bearing) to at least one of the non-rotatable and rotatable sections of the wheel bearing yields an accurate force determination at the wheel bearing, as can be appreciated by those skilled in the art. Positioning any type of sensor (whose output is used for determining at least one component of a force applied to the rotatable section of the wheel bearing) in the bearing cavity between the inboard and outboard seals protects the sensor from road and environmental hazards. In the optional construction wherein the sensor is permanently attached, safety is ensured by preventing unauthorized repair. Such sensors, whether permanently or non-permanently attached, are useful, for example, in controlling a vehicle.

The foregoing description of several expressions of embodiments and of a method of the invention has been presented for purposes of illustration. It is not intended to be exhaustive or to limit the invention to the precise form or procedure disclosed, and obviously many modifications and variations are possible in light of the above teaching. It is intended that the scope of the invention be defined by the claims appended hereto.

What is claimed is:

1. A vehicle wheel bearing comprising:
   a) a vehicle-wheel-bearing non-rotatable section;
   b) a vehicle-wheel-bearing rotatable section rotatably attached to the non-rotatable section, wherein at least one of the non-rotatable and rotatable sections includes at east a portion of an inboard bearing seal, wherein at least one of the non-rotatable and rotatable sections includes at least a portion of an outboard bearing seal, and wherein the outboard bearing seal is spaced apart from the inboard bearing seal;
   c) rolling elements disposed between the non-rotatable and rotatable section; and
   d) at least one sensor disposed between the inboard and outboard beam seals and having an output used for determining at least one component of a force applied to the rotatable section, wherein the determined at-least-one component is an input to a vehicle control system, and wherein the at-least-one sensor includes a stress-based load sensor, a distance-measuring sensor, and/or a rolling-element-passage-sensing sensor.

2. The vehicle wheel bearing of claim 1, wherein the vehicle control system is chosen from the group consisting of a vehicle braking system, a vehicle anti-lock braking system, a vehicle stability enhancement system, a vehicle anti-rollover system, a vehicle traction system, and a vehicle acceleration system.

3. The vehicle wheel bearing of claim 2, wherein the output is used for determining three mutually orthogonal components of the force.

4. The vehicle wheel bearing of claim 1, wherein the at-least-on sensor includes a stress-based load sensor.

5. A vehicle wheel bearing comprising:
   a) a vehicle-wheel-bearing non-rotatable section;
   b) a vehicle-wheel-bearing rotatable section rotatably attached to the non-rotatable section, wherein at least one of the non-rotatable and rotatable sections includes at least a portion of an inboard bearing seal, wherein at least one of the non-rotatable and rotatable sections includes at least a portion of an outboard bearing seal, and wherein the outboard bearing seal is spaced apart from the inboard bearing seal; and
   c) at least one sensor disposed between the inboard and outboard bearing seals and having an output used for determining at least one component of a force applied to the rotatable section, wherein the determined at-least-one component is an input to a vehicle control system, wherein the rotatable section includes a first race, wherein the non-rotatable section includes a second race, wherein the first and second races define a raceway, wherein the vehicle wheel bearing also includes rolling elements disposed in the raceway, and wherein the at-least-one sensor senses the passage of the rolling elements around the raceway past the at-least-one sensor.

6. A vehicle wheel bearing comprising:
a) a vehicle-wheel-bearing non-rotatable section;
b) a vehicle-wheel-bearing rotatable section rotatably attached to the non-rotatable section, wherein at least one of the non-rotatable and rotatable sections includes least a portion of an inboard bearing seal, wherein at least one of the non-rotatable and rotatable sections includes at least a portion of an outboard bearing seal, and wherein the outboard bearing seal is spaced apart from the inboard bearing seal; and
c) at least one sensor disposed between the inboard and outboard bearing seals and having an output used for determining at least one component of a force applied to the rotatable section, wherein the determined at-least-one component is an input to a vehicle control system, wherein the at-least-one sensor measures the distance between the non-rotatable and rotatable sections.

7. A vehicle wheel bearing comprising:
a) a vehicle-wheel-bearing non-rotatable section;
b) a vehicle-wheel-bearing rotatable section rotatably attached to the non-rotatable section; and
c) at least one sensor attached to at least one of the non-rotatable and rotatable sections and having an output used for determining at least one component of a force applied to the rotatable section, wherein the rotatable section includes a first race, wherein the non-rotatable section includes a second race, wherein the first and second races define a raceway, wherein the vehicle wheel bearing also includes rolling elements disposed in the raceway, and wherein the at-least-one sensor senses the passage of the rolling elements around the raceway past the at-least-one sensor.

8. The vehicle wheel bearing of claim 7, wherein the at-least-one sensor is attached to the second race.

9. The vehicle wheel bearing of claim 7, wherein the at-least-one sensor is permanently attached to the second race.

10. The vehicle wheel bearing of claim 7, wherein the determined at-least-one component is an input to a vehicle control system.

11. A vehicle wheel bearing comprising:
a) a vehicle-wheel-bearing non-rotatable section;
b) a vehicle-wheel-bearing rotatable section rotatably attached to the non-rotatable section; and
c) at least one sensor attached to at least one of the non-rotatable and rotatable sections and having an output used for determining at least one component of a force applied to the rotatable section, wherein the at-least-one sensor measures the distance between the non-rotatable and rotatable sections.

12. The vehicle wheel bearing of claim 11, wherein the non-rotatable section includes a hub, and wherein the at-least-one sensor is attached to the hub.

13. The vehicle wheel bearing of claim 12, wherein the at-least-one sensor is permanently attached to the hub.

14. The vehicle wheel bearing of claim 11, wherein the determined at-least-one component is an input to a vehicle control system.

15. A vehicle wheel bearing comprising:
a) a vehicle-wheel-bearing non-rotatable section;
b) a vehicle-wheel-bearing rotatable section rotatably attached to the non-rotatable section; and
c) at least one sensor attached to at least one of the non-rotatable and rotatable sections and having an output used for determining at least one component of a force applied to the rotatable section, wherein the at-least-one sensor measures temperature, wherein the determined at-least-one component is an input to a vehicle control system, and wherein the output of the at-least-one sensor is used without any non-temperature sensor output for determining the at-least-one component of the force.

16. The vehicle wheel bearing of claim 15, wherein the non-rotatable section includes a hub, and wherein the at-least-one sensor is attached to the hub.

17. The vehicle wheel bearing of claim 16, wherein the at-least one sensor is permanently attached to the hub.

18. The vehicle wheel bearing of claim 15, wherein the vehicle control system is chosen from the group consisting of a vehicle braking system, vehicle anti-lock braking system, a vehicle stability enhancement system, a vehicle anti-rollover system, a vehicle traction system, and a vehicle acceleration system.

19. A method for controlling a vehicle having a wheel bearing including a non-rotatable section, including a rotatable section rotatably attached to the non-rotatable section, and including rolling elements disposed between the non-rotatable and rotatable sections, wherein the method comprises the steps of:
a) attaching at least one sensor to at least one of the non-rotatable and rotatable sections, wherein the at-least-one sensor measures at least one of the passage of the rolling elements and the distance between the non-rotatable and rotatable sections, and wherein the at-least-one sensor has an output;
b) determining at least one component of a force applied to the rotatable section from the output of the attached at-least-one sensor of step a); and
c) controlling the vehicle based at least in part on the determined at-least-one component of step b).

20. The method of claim 19, wherein step b) determines three mutually orthogonal components of the force.

* * * * *